April 17, 1951 H. K. I. SORENSEN 2,548,915
TRAWL RUNNER

Filed Dec. 28, 1946 2 Sheets-Sheet 1

INVENTOR.
HAROLD K. I. SORENSEN
BY
Ezekiel Wolf
ATTORNEY

INVENTOR.
HAROLD K. I. SORENSEN
BY
ATTORNEY

Patented Apr. 17, 1951

2,548,915

UNITED STATES PATENT OFFICE 2,548,915

TRAWL RUNNER

Harold K. I. Sorensen, Cambridge, Mass.

Application December 28, 1946, Serial No. 718,909

12 Claims. (Cl. 43—9)

The present invention relates to a trawl runner of the type used for deep sea fishing, in which seines of the trawl net type are dragged over the sea bottom.

In this type of trawl runner, the runner is drawn by line from the boat in such a manner that the trawl net is kept open as it is drawn by the vessel. In keeping the trawl net open, the runner must be so rigged that one component of force acting against it must be directed laterally to the direction of the drag. As a result of this, as the boat draws the net through the water, the mouth of the net will be maintained in an open condition so that the fish may be drawn into the net. In the usual type of seines used for this purpose, two runners may be used, one at each side of the net, each drawn by its own line from the steam trawler or other operating vessel.

In most types of runners, the runner is dragged over the sea bottom with the edge of the runner scraping the sea bottom. If the sea bottom is uneven and has numerous rocks, considerable strain at times will be put on the line and the progress of the trawling will not be smooth. This I have found to be the great difficulty in constructing a trawl runner which will roll smoothly over the ocean bottom under conditions which may be generally met.

The object of the present invention is to construct a trawl runner of the type described above, in which the outward thrust of the ground plate on the otter doors will be uniformly distributed. A further object of the present invention is to construct a trawl runner which will be easy to operate, cheap to manufacture, durable in construction, and may be readily serviced whenever necessary, in fact at any time or every time it is put into the water.

Further advantages and objects of the present invention will be more readily understood from the description in the specification below of an embodiment of the invention taken in connection with the drawings, in which.

Figure 2:
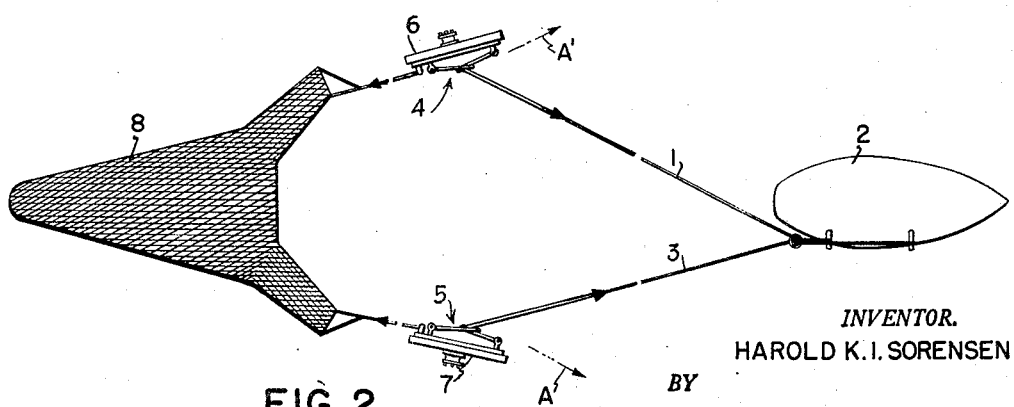
Figure 2 shows the general arrangement in plan view of the runner, net, and vessel.

In the arrangement shown in the figures, referring to Figure 2, the vessel 2 has two lines 1 and 3, which are attached each to the otter doors 4 and 5 of the trawl runners 6 and 7. The trawl runners 6 and 7 may be located each at one side of the net or seine 8. The otter doors face each other and the line to the vessel and to the net are attached on facing sides, thus holding the mouth of the net open in the direction somewhat as shown by the arrows A' and A' (Figure 2).

The term otter door is often used to designate the complete trawl board with its component parts. In the present application the unit as a whole is called a trawl runner because it runs on the ground rather than being just a board which is dragged over the ground. The otter doors designate the complete assembly which is fixed as opposed to rotation and to which the various lines are attached.

Figure 1:
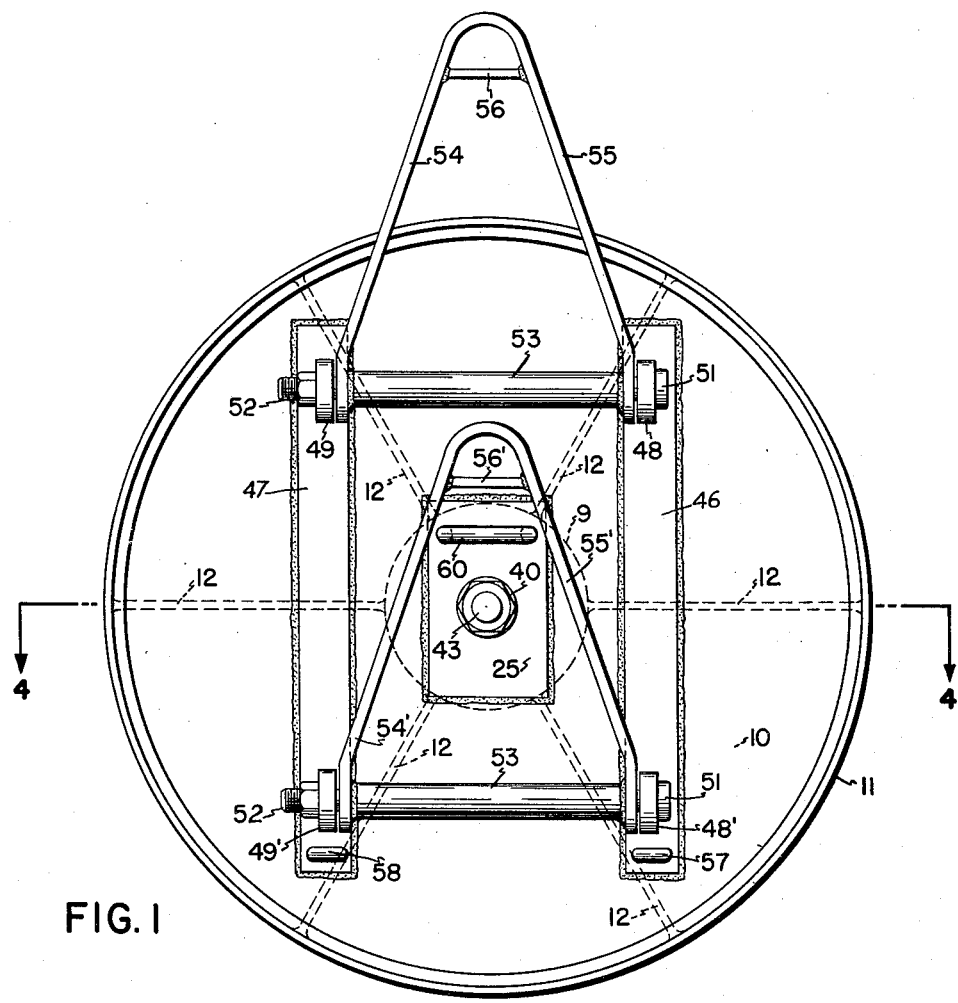
Figure 1 shows an elevation of the runner as viewed from one side thereof.
Figure 4:
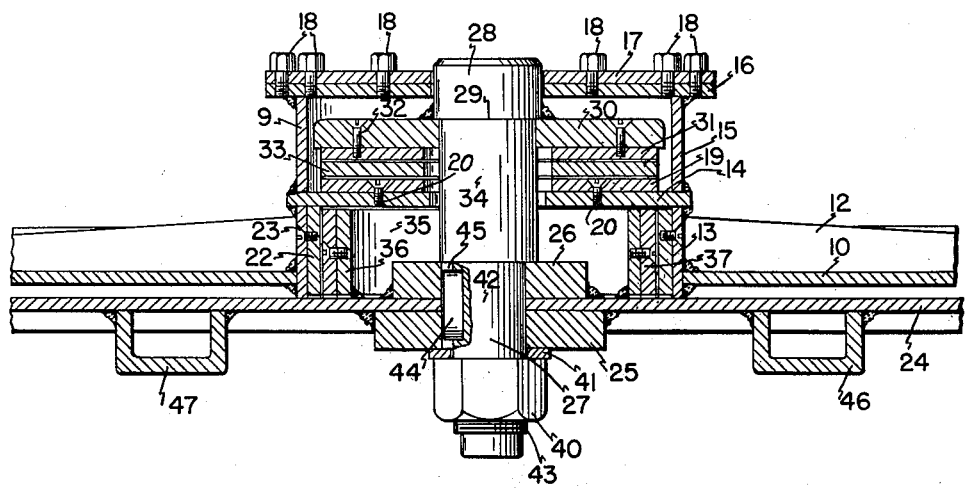
Figure 4 shows a sectional view taken generally on the line 4—4 of Figure 1.
Figure 3:
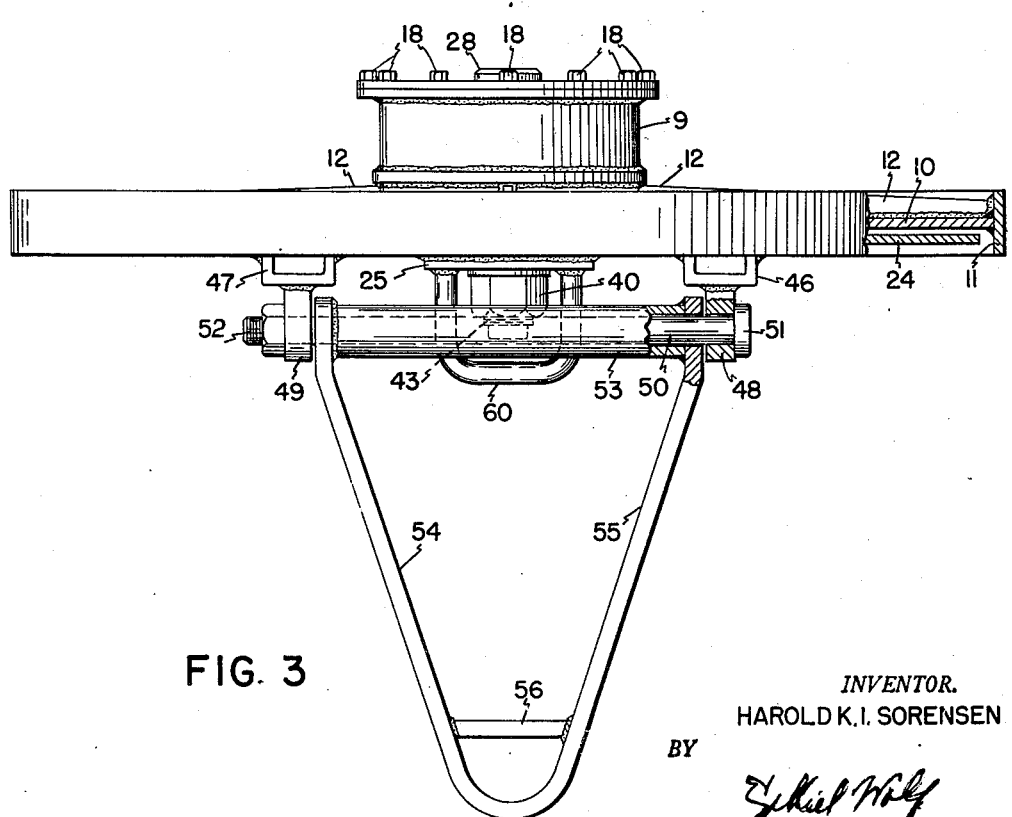
Figure 3 shows a side view of the runner shown in Figure 1 with portions in fragmentary sections.

The trawl runners 6 and 7 are shown in detail in Figures 1, 3, and 4. These comprise a plate 10 which is circular in shape and provided at the edge with a ring or flange 11 substantially normal to the plane of the plate and serving as a rim on which the ground plate 10 rolls. This plate is preferably reinforced by ribs 12, 12, spaced radially around the plate. At the center of the plate is a hub 9 built up of various elements; a cylindrical collar 13 is welded into an opening in the plate. This collar is capped by a small plate or intermediate cross plate 14 over which is positioned a second collar 15 which may be of the same size as the collar 13 and coaxially positioned with it. A top cap 16 is welded at the end of the hub 9 and this may be covered by a reinforcing cap or plate 17 welded to the plate 16 by a series of bolts 18 extending around the periphery of the plate thus connecting the hub thereto. Attached to the plate 14 is a facing plate 19. This plate may be attached by means of screws 20 which are set flush within the surface of the plate 19. The plate 19 may be a bearing plate against which the plate 33 rubs, the plate 33 being free of the mechanism which turns with respect to the plate 10 as will presently be explained. Within the collar 13 there is attached a second collar or internal bearing ring 22 which serves as a bearing collar against which the other portion of the device may roll. This collar 22 is fastened by means of screws 23 to the collar 13. The elements just described are all securely attached to one another and work or rotate as a unit as the outer surface of the flange 11 is drawn over the ground.

Positioned in face to face relation with the plate 10 is a second plate 24 which extends just short of the flange 11 of the plate 10. This second plate may be called the outer door plate and both the trawling net and the line are secured to it as will be seen. The plate 24 has at its center a block 25 welded on the outside with a second block 26 welded on the inside. The block 25 may be square or rectangular in shape and has centrally located a cylindrical opening through which the shaft 27 extends into the hub 9. The shaft 27 is journalled centrally through both plates 10 and 24 and is provided at its upper end as viewed in Figure 4 with an enlarged section 28 which extends through an opening in the back plates 16 and 17 of the hub in a rotating fit. The enlarged section 28 of the shaft is provided with a cylindrical shoulder 29 where the shaft is diminished. A plate 30 is welded to the shaft at this point and to this plate 30 is attached a face plate 31 by means of the bolts 32. Between the face plate and the plate 19 of the other portion of the system, there is inserted as above stated a wearing plate 33 which may be of softer material and permit wear between the relatively two rotating elements of the system. The plates 14, 19, 33, and 31 may have a sufficiently large central hole to accommodate the section 34 of the shaft 27 and the space surrounding this portion of the shaft between the plate 24 and the plate 14 may be such as to accommodate considerable grease which is packed into the space 35 before the runner is lowered into the water.

Welded securely to the plate 24 is an inner collar 36 and over this collar is slipped a second collar or bearing ring 37 which bears against the collar or bearing ring 22 attached to the collar 13 which is rigidly associated with the plate 10. The rotating bearing surface between the two elements 10 and 24 is principally cared for by the engaging surfaces of the two collars 22 and 37. The thrust bearing between the plates is cared for by contact between the plate or plate flange 30 and its face plate 31 attached to the shaft 27 on the one part and the intermediate plate 14 and its face plate 19 attached to the plate 10 on the other part. This cares for the thrust downward in the plane of the paper as viewed in Figure 4. The thrust upward is taken care of by contact between the ends of the collars 36 and 37 acting against the face of the plate 14 and also by the inner surface of the plate 24 acting against the edge of the collar 13 and inner edge of the collar 22. The shaft 27 is secured to the plate 24 by the clamping nut 40 which threads on to the end of the shaft 27 and clamps against the surface of the block 25 over the washer 41. The shaft 27 is decreased in size in the section 42 between the sections 34 and the threaded section 43 at the end of the shaft. A large pin 44 is set in the shaft and locks the shaft 27 in the key-way 45 extending downward from the surface of the block 25 through the plate 24 and the block 26.

On the face of the plate 24, are welded two C-shaped channel members 46 and 47. These C-shaped channel members have bearing lugs 48 and 49 welded or attached to them. There are two such pairs of lugs (Fig. 1) 48, 49, and 48', 49'. These pairs of lugs have eyelet elements aligned with each other. The shaft or long pin 50 with a head 51 at one end and a threaded shank 52 at the other end spans the space between the two eyelet bearings. This shaft 50 swivels a sleeve or collar 53 which has a loop formed with arms 54 and 55 joining together but extending from the ends of the collar 53 with a cross bar 56 forming an additional support near the joining ends. The loop so formed is swiveled on the shaft 50 in an axis which in Figure 3, for instance, is in the plane of the paper. The otter door 4, as will be seen from Fig. 1, has two such loops, one 54, 55, and 56, and the other otter door 5 54', 55', and 56', each pivoted in substantially the same plane in parallel relation to each other. These loops are attached to the lines to the ship and permit the axis of the runners 6 and 7 to swing therefore as viewed in Fig. 1 about the center axis, perpendicular to the otter doors 4 and 5. The net is attached to loops or eyelets 57 and 58 which are attached to channels 46 and 47 at one end thereof. A lifting link 60 may also be attached to the center block 25.

It will be seen on a comparison of Figs. 2 and 4 that the thrust due to the action of the water is substantially along the shaft 27 while the other two forces acting on the runner are, of course, in the direction parallel to the line extending from the runner to the vessel and in the direction parallel to the line extending from the runner to the net, respectively.

As the boat goes through the water, this thrust at times becomes very strong and should be taken up uniformly on or against a single or integral shaft element. The coaxial collars, central shaft, and bearing plates of the present invention permit this to be done.

A further feature which will be seen from the present construction is that the device is easily taken apart and reassembled. All that is necessary is to remove the nut 40, in which case the whole front plate 24, including the collar 36 and its bearing collar 37, may be removed leaving the bearing shaft 27 in its hub assembly permitting cleaning and regreasing when this is necessary.

Having now described my invention, I claim:

1. A trawl runner comprising a ground plate having an outer ground engaging ring, a second plate positioned parallel to the first plate, a hub means having two coaxial parts sliding relatively on each other, one portion attached to the ground engaging plate and the other to said second plate, means contained in said hub for providing thrust bearings in directions normal to the plane of the plates, and means attached to said second plate for connecting respectively to the line from a vessel and the line to a net.

2. A trawl runner comprising a ground plate having an edge adapted to engage the ground, a second plate, means journalling said two plates, supporting the same in parallel relationship and with the rotational axes of said journalling means coincidental with the rotational axes of said plates, said means providing a thrust bearing between said plates having its axis coincidental with said axes, and means attached to said second plate for connecting to a line from a vessel and to a line to a net.

3. A trawl runner comprising a ground plate having an outer edge adapted to engage the ground, a second plate, means journalling said second plate in parallel relation with the first plate whereby the ground plate may be rotated with respect to the second plate, means attached to the second plate having a loop swiveled thereto for connecting to a line from a vessel, and loop means directly and rigidly attached to said second plate for connecting to a net.

4. A trawl runner comprising a ground plate having an outer edge adapted to engage the ground, a second plate, means journalling said second plate in parallel relation with the first plate whereby the ground plate may be rotated with respect to the second plate, means attached to the second plate having a loop swivelled thereto for connecting to a line from a vessel and means also attached thereto for connecting to a net, said journalling means comprising a collar coaxially positioned with respect to the ground plate, and a collar coaxially positioned with respect to the second plate, said two collars having a sliding fit with one another and a cross plate extending across the ends of said collars for taking up thrusts normally to said plates.

5. In a trawl runner of the type described, having a ground plate adapted to roll over the ground and a second plate, means for coaxially journalling the ground plate to said second plate including thrust bearing means comprising a hub formed in parts attached to the ground plate having an intermediate cross plate positioned between said parts of said hub, and a central shaft coaxial with said second plate having a plate flange attached thereto engaging the intermediate cross plate positioned intermediate of said parts of the hub and a pair of bearing collars bearing against each other, one attached to the inside of the hub and the other attached to the second plate.

6. In a trawl runner of the type described having a circular plate adapted to roll on the ground and a second plate positioned in opposed relation and coaxial thereto, a journalling and thrust bearing means interlocking the two plates, and a hub casing in which said journalling elements revolve, said casing having open portions adapted to be filled with a greasing material.

7. In a trawl runner of the type described, a ground plate having an outer ground engaging ring, a second plate positioned parallel and coaxially with the first plate, means journalling said plates coaxially to each other, said means comprising a hub casing having a plurality of plates positioned parallel to the ground and second plates respectively, and a shaft coaxially positioned in said hub and supported in said second plate, some of said parallel plates in said hub casing being supported by said shaft and some by said casing accounting for the lateral thrust between the ground plate and said second plate.

8. In a trawl runner of the type described comprising a ground plate having an outer rim adapted to engage the ground and roll along the same, a second plate positioned in opposed relation to the ground plate and coaxial with the same, means journalling said plates to each other comprising a hub casing coaxially positioned with respect to said plates providing an internal bearing ring for the ground plate and a collar coaxially positioned on said second plate comprising a bearing ring bearing against the internal bearing ring of said ground plate, a shaft removably attached to said second plate and contained in said hub coaxial thereto, a thrust bearing plate attached to said shaft, and a thrust bearing plate supported within said hub, said thrust bearing plates being positioned opposing one another to account for lateral thrust elements.

9. In a trawl runner of the type described, comprising a ground plate having an outer rim adapted to engage the ground and roll along the same, a second plate positioned in opposed relation to the ground plate and coaxial with the same, means journalling said plates to each other comprising a hub casing attached to said ground plate coaxially positioned with respect to said plates having an internal bearing ring for the ground plate, a second bearing ring mounted on the second plate coaxially positioned with respect to said internal bearing ring and bearing against the same, a shaft removably attached to said second plate and contained in said hub casing coaxially thereto, a thrust bearing plate attached to said shaft, and a thrust bearing plate supported within said hub, said thrust bearing plates being positioned opposing one another to account for lateral thrust elements, said shaft being retained within said hub and said second plate attachable only to said shaft whereby said second plate is readily removed.

10. A trawl runner comprising a ground plate having an edge adapted to engage the ground, a second plate, means journalling said two plates, supporting the same in parallel relationship and with their rotational axes coincidental with the rotational axes of said plates, said means providing a thrust bearing between said plates having its axis coincidental with said axes, and means attached to said second plate for connecting to a line from a vessel and to a line to a net, a plurality of channels attached in parallel relationship to said plate and having thereon eyelet bearings connected by a freely turning shaft, and a collar on said shaft having members forming a loop serving to engage the line to a vessel.

11. A trawl runner comprising a ground plate having an edge adapted to engage the ground, a second plate, means journalling said two plates, supporting the same in parallel relationship with their rotational axes coincidental with the rotational axes of said plates, said means providing a thrust bearing between said plates having its axis coincidental with said axes, and means attached to said second plate for connecting to a line from a vessel and to a line to a net, and two pair of eyelet elements attached in spaced relation on said second plate supporting a bearing rod, each said bearing rod having a long sleeve with members at the end forming a loop whereby the line to a vessel may be attached thereto.

12. A trawl runner comprising a ground plate having an edge adapted to engage the ground, a second plate, means journalling said two plates, supporting the same in parallel relationship with their rotational axes coincidental with the rotational axes of said plates, said means providing a thrust bearing between said plates having its axis coincidental with said axes, and means attached to said second plate for connecting to a line from a vessel and to a line to a net, a plurality of channels attached in parallel relationship to said second plate and having thereon eyelet bearings connected by a freely turning shaft, a collar on said shaft having members forming a loop serving to engage the line to a vessel, and ring members supported on said channels for engaging the line to a net.

HAROLD K. I. SORENSEN.

REFERENCES CITED

The following references are of record in the file of this patent:

UNITED STATES PATENTS

| Number | Name | Date |
| --- | --- | --- |
| 852,135 | Obee | Apr. 30, 1907 |

FOREIGN PATENTS

| Number | Country | Date |
| --- | --- | --- |
| 17,685 | Great Britain | 1898 |
| 437,667 | Great Britain | Nov. 4, 1935 |